(12) United States Patent
Das et al.

(10) Patent No.: US 8,180,877 B2
(45) Date of Patent: May 15, 2012

(54) LOGICALLY PARTITIONED SYSTEM HAVING SUBPARTITIONS WITH FLEXIBLE NETWORK CONNECTIVITY CONFIGURATION

(75) Inventors: Ranadip Das, Kolkata (IN); Eric P. Fried, Austin, TX (US); Rajeev Mishra, Austin, TX (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 12/478,027

(22) Filed: Jun. 4, 2009

(65) Prior Publication Data
US 2010/0312868 A1    Dec. 9, 2010

(51) Int. Cl.
G06F 15/173 (2006.01)
G06F 15/167 (2006.01)
G06F 13/00 (2006.01)

(52) U.S. Cl. .. 709/223; 709/212; 711/154; 711/E12.001
(58) Field of Classification Search ........................ None
See application file for complete search history.

(56) References Cited

U.S. PATENT DOCUMENTS

| | | | |
|---|---|---|---|
| 7,047,337 B2 | 5/2006 | Armstrong et al. | |
| 7,324,512 B2* | 1/2008 | Larson et al. | 370/389 |
| 7,346,792 B2 | 3/2008 | Anderson et al. | |
| 7,404,012 B2* | 7/2008 | Matters et al. | 709/250 |
| 7,561,531 B2 | 7/2009 | Lewites et al. | |
| 7,685,251 B2 | 3/2010 | Houlihan et al. | |
| 2005/0182853 A1 | 8/2005 | Lewites et al. | |
| 2006/0031407 A1 | 2/2006 | Dispensa et al. | |
| 2006/0123111 A1 | 6/2006 | Dea et al. | |
| 2006/0123204 A1* | 6/2006 | Brown et al. | 711/153 |
| 2006/0250945 A1 | 11/2006 | Fernandes et al. | |
| 2009/0307444 A1* | 12/2009 | Cyr et al. | 711/154 |

OTHER PUBLICATIONS

Siraj A. Shaikh, Howard Chivers, Philip Nobles: John A. Clark, and Hao Chen: "False Positive Response;" Network Security; Dec. 2008; pp. 11-15; BNSDOCID:<XP_25800667A_I_>.
International Search Report & Writtend Opinion; Application No. PCT/EP2010/056660; published Oct. 7, 2010.

* cited by examiner

*Primary Examiner* — Wen-Tai Lin
(74) *Attorney, Agent, or Firm* — Yudell Isidore Ng Russell PLLC (57) ABSTRACT

A method of configuring a data processing system for facilitating network communications involves creating a primary logical partition (LPAR) in the data processing system, the LPAR configured to host a specified operating system. The method further includes creating a first virtual network adapter within the LPAR, associating the first virtual network adapter with a first network address, and binding the first virtual network adapter to the LPAR. The method additionally involves creating a first logical subpartition (LSPAR) within the LPAR, the first LSPAR configured to employ said specified operating system and no other. The method also includes creating a second virtual network adapter within the LPAR, associating the second virtual network adapter with a second network address, wherein the second network address is not an alias network address of the first network address, and binding the second virtual network adapter to the first LSPAR.

15 Claims, 4 Drawing Sheets

LOGICALLY PARTITIONED SYSTEM HAVING SUBPARTITIONS WITH FLEXIBLE NETWORK CONNECTIVITY CONFIGURATION

BACKGROUND

1. Technical Field

The invention relates generally to data processing systems that employ virtualization and sharing of computing resources. More specifically, the invention relates to systems, products, and methods for configuring network communications in a logically partitioned data processing system.

2. Description of the Related Art

Logical partitioning of a physical data processing system allows utilization of several concurrent instances of one or more operating systems on a single physical processor, thereby allowing the partitioning of a physical data processing system into several independent logical data processing systems capable of running applications in multiple, independent environments simultaneously. For example, logical partitioning makes it possible to run a single application using different sets of data on separate partitions, as if the application was running independently on separate physical systems.

In a known system, the resulting logical structure consists of primary logical partitions (LPARs) and one or more logical subpartitions (sometimes referred to as workload partitions or WPARs) associated with a respective LPAR. Network communication for an LPAR may be achieved by assigning a physical network interface, along with a corresponding network address, to the LPAR. In some systems, a WPAR performs network communications via the physical network interface using an alias network address that is resolved to the LPAR network address. In other words, the LPAR and the WPAR share a common driver stack binding.

SUMMARY OF ILLUSTRATIVE EMBODIMENTS

Embodiments of the invention are generally directed to network communications in logically partitioned data processing systems. One implementation of the invention is directed to a method of configuring a data processing system for facilitating network communications. The method involves creating a primary logical partition in the data processing system, the primary logical partition hosting a specified operating system. The method further includes creating a first virtual network adapter within the primary logical partition, associating the first virtual network adapter with a first network address, and binding the first virtual network adapter to the primary logical partition. The method additionally involves creating a first logical subpartition within the primary logical partition, the first logical subpartition configured to employ said specified operating system and no other. The method also includes creating a second virtual network adapter within the primary logical partition, associating the second virtual network adapter with a second network address, wherein the second network address is not an alias network address of the first network address, and binding the second virtual network adapter to the first logical subpartition.

In another aspect, the inventive method also can involve creating a second logical subpartition within the primary logical partition, creating a third virtual network adapter within the primary logical partition, associating the third virtual network adapter with a third network address, wherein the third network address is not an alias network address of the first network address, and binding the second logical subpartition to the third virtual network adapter.

In yet another aspect, the inventive method can include unbinding the primary logical partition from the first virtual network adapter such that the first virtual network adapter is disabled from performing network communications, and performing network communications via the second virtual network adapter.

In one more aspect, the inventive method can further involve performing network communications internal to the primary logical partition, wherein the first logical subpartition communicates with the second logical subpartition via the second and third virtual network adapters.

In one implementation, the invention concerns a data processing system having computing resources (such as processors, memory, network adapters, input/output interfaces or devices, etc.) managed by one or more computer logic modules ("partition manager"). The partition manager is configured to implement the inventive methods described above.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Embodiments of the invention are generally directed to network communications in logically partitioned data processing systems. One implementation of the invention is directed to a method of configuring a data processing system for facilitating network communications. The method involves creating a primary logical partition in the data processing system, the primary logical partition hosting a specified operating system. The method further includes creating a first virtual network adapter within the primary logical partition, associating the first virtual network adapter with a first network address, and binding the first virtual network adapter to the primary logical partition. The method additionally involves creating a first logical subpartition within the primary logical partition, the first logical subpartition configured to employ said specified operating system and no other. The method also includes creating a second virtual network adapter within the primary logical partition, associating the second virtual network adapter with a second network address, wherein the second network address is not an alias network address of the first network address, and binding the second virtual network adapter to the first logical subpartition.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention. It is understood that the use of specific component, device and/or parameter names are exemplary only and not meant to imply any limitations on the invention. The invention may thus be implemented with different nomenclature or terminology used to describe the components, devices, or parameters herein, without limitation. Each term used herein is to be given its broadest interpretation given the context in which that terms is used.

As used here, the term "data processing system" includes any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

Embodiments of the invention are generally related to technology described in U.S. patent application Ser. No. 11/002,560, entitled "Method and System for Shared Input/output Adapter in Logically Partitioned Data Processing System," filed on Dec. 2, 2004, and which is hereby incorporated by reference herein in its entirety.

In some logically partitioned systems, one or more logical subpartitions (LSPARs) are configured to use, respectively, an alias network address of a primary logical partition (LPAR) that hosts the LSPARs. Because the LPAR and LSPARs share the same driver stack binding, some drawbacks arise. For example, a network adapter attribute for a specific LSPAR cannot be changed because a modification of the network adapter attribute would apply not only to the specific WPAR but also to the LPAR and all of the other LSPARs hosted by the LPAR.

To further illustrate the problem mentioned above, a logically partitioned data processing system may include LPAR X configured to host LSPAR A and LSPAR B. The primary network address (e.g., an Internet Protocol (IP) address) of LPAR X is 9.1.1.1, which corresponds to a network adapter ent0. The IP address of LSPAR A is 9.1.1.2, and the IP address of LSPAR B is 9.1.1.3. As typically configured in the prior art, the IP address 9.1.1.2 and 9.1.1.3 are alias IP addresses of ent0. That is, LPAR X, LSPAR A, and LSPAR B share the same network adapter ent0.

Assume that for some reason it becomes desirable to disable Transfer Control Protocol (TCP) segmentation offload, for example, from LSPAR A. To turn off TCP segmentation offload, the largesend attribute of the network adapter would have to be changed. Because the network adapter driver is shared by LPAR X, LSPAR A, and LSPAR B, making that change to the network adapter attribute would affect not just LSPAR A but also LPAR X and LSPAR B, in effect turning off TCP segmentation offload for LPAR X and LSPAR B as well.

In the case where changing an attribute of the network adapter requires taking the network adapter offline, it would not be possible to simply turn off the network adapter of just one of LPAR X, LSPAR A, and LSPAR B. Therefore, taking the network adapter offline to change a network adapter attribute associated with LSPAR A, for example, would adversely affect the network connections of LPAR X and LSPAR B.

Inventive embodiments disclosed here address the drawbacks of the prior art configurations by providing flexible and independent network connectivity to each of LPAR X, LSPAR A, and LSPAR B. As will be further describe below, for each primary logical partition and each logical subpartition a virtual network adapter having its own virtual network adapter driver is provided. Because the network driver for each logical partition and logical subpartition is independent of the others, the problems illustrated above are solved.

Figure 1:
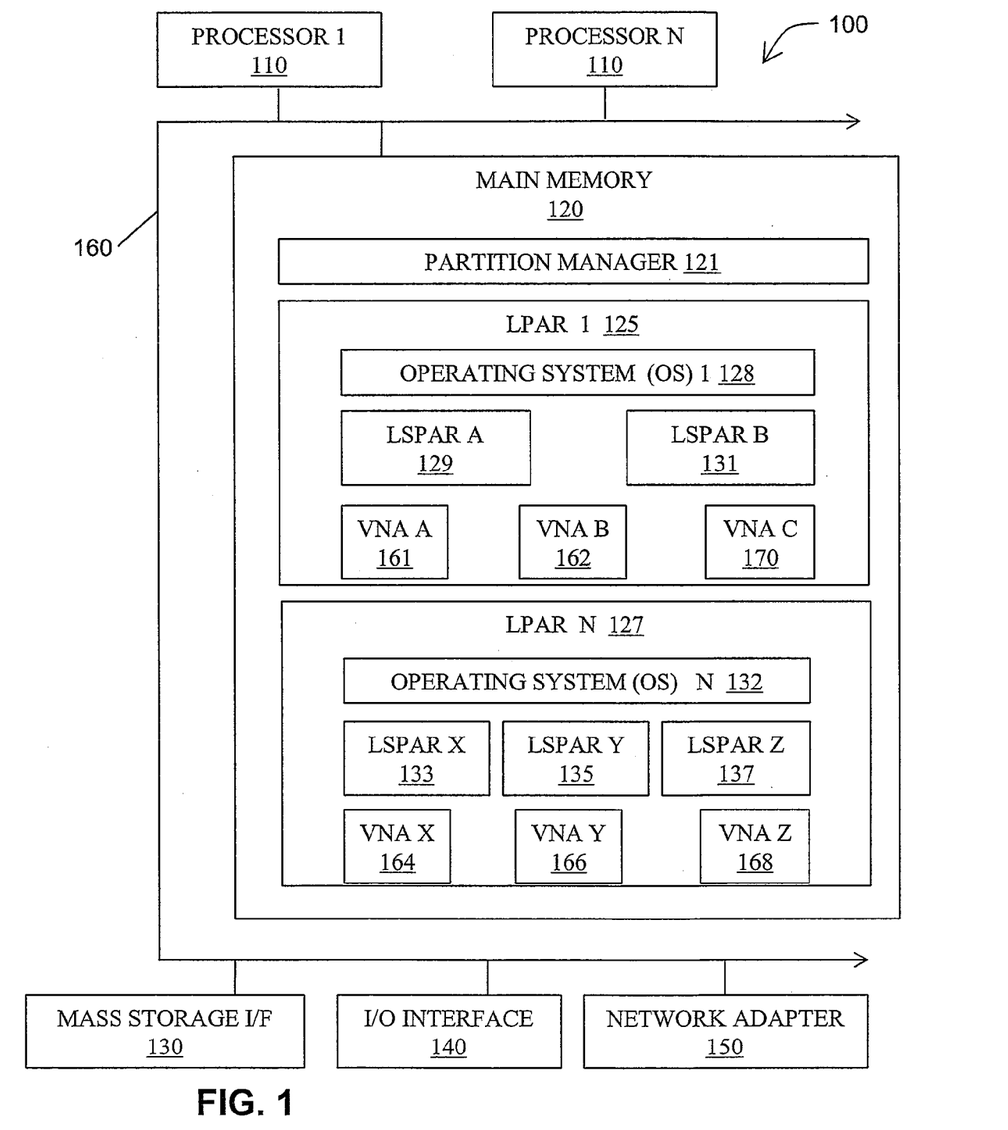
FIG. 1 is a block diagram of one embodiment of certain components of a data processing system configured in accordance with the invention.

Referring to FIG. 1, exemplary data processing system 100 is configured to support logical partitioning and network connectivity in accordance with certain embodiments of the invention. As shown in FIG. 1, data processing system 100 includes one or more processors 110 connected to main memory 120, mass storage interface 130, input/output interface 140, and network adapter 150. Although only a single network adapter 150 is illustrated, the present invention may utilize one or more physical network adapters to transmit and receive data of one or more virtual network adapters. These system components are interconnected through the use of a system bus 160. Mass storage interface 130 connects mass storage devices (not shown) to data processing system 100. Although data processing system 100 is shown with only a single system bus 160, the present invention may be practiced using a data processing system that has multiple buses.

Partition manager 121, residing in main memory 120, creates and manages the partitioning of data processing system 100. For example, partition manager 121 can create one or more primary logical partitions LPAR 1 125 and LPAR N 127. By virtualizing hardware resources of data processing system 100, partition manager 121 allows simultaneous execution of independent operating systems OS 1 128 and OS N 132, for example. In some embodiments, at least some of the functionality of partition manager 121 can be provided by one or more known virtualization technologies, such as Hypervisor and Virtual I/O Server (VIOS) products available from International Business Machines Corporation.

LPARs 125 and 127 are shown in FIG. 1 residing within main memory 120. However, a partition is a logical construct that includes resources other than memory. In creating and managing a logical partition, partition manager 121 typically assigns to a logical partition portions of memory, processor capacity, and other system resources. Thus, partition manager 121 can initially define LPAR 1 125 to include one or more processors 110, a portion of memory 120, and one or more portions of I/O resources (e.g., mass storage interface 130, input/output interface 140, network adapter 150, and interfaces to other I/O devices). Partition manager 121 can also define LPAR N 127 to initially include a processor allocation, a different portion of memory 120, and one or more I/O resources. Thus, LPARs 125 and 127 are shown in FIG. 1 to represent logical partitions that include system resources outside of memory 120 within data processing system 100. Each of LPAR 1 125 and LPAR N 127 are configured to host a respective OS 1 128 and OS N 132. OS 1 128 may be of the same type as OS N 132, or may be a completely different operating system. LPARs 125 and 127 can be considered independent virtual machines configured to execute applications on separate, independent instances of operating systems supported by a single physical data processing system.

Partition manager 121 is additionally configured to create logical subpartitions within primary logical partitions LPAR 1 125 and LPAR N 127. Thus, for example, LPAR 1 125 includes logical subpartitions LSPAR A 129 and LSPAR B 131. Similarly, LPAR N 127 can include logical subpartitions LSPAR X 133, LSPAR Y 135, and LSPAR Z 137. In general, a logical subpartition (LSPAR), as implemented in the inventive embodiments disclosed here, is a virtualized and isolated operating system environment within a single image of a non-virtual operating system. Though multiple LSPARs share the same instance of an operating system, execution of an application in a given LSPAR does not interfere with the execution of another application in a different LSPAR. Thus, for example, the processes belonging to LSPAR A 129 are isolated from the processes belonging to LSPAR B 131, even though both LSPAR A 129 and LSPAR B 131 are supported by a single instance of OS 1 128. A LSPAR supports its hosted application as if the application were being executed in its own dedicated operating system instance.

While partition manager 121 and the LPARs 125 and 127 are shown to reside in main memory 120, these items are not necessarily all completely contained in main memory 120 at the same time. It should also be noted that the term "memory" is used herein to generically refer to the entire virtual memory of data processing system 100. Main memory 120 stores programs and data that processor 110 may access. Processor 110 may be constructed from one or more microprocessors and/or integrated circuits. Processor 110 executes program instructions stored in main memory 120. When data processing system 100 starts up, processor 110 initially executes the program instructions that make up partition manager 121, which initializes operating systems OS 1 128 and OS N 132.

Input/output interface 140 is used to connect to one or more input/output devices, such as for example, a display device, keyboard, and pointing device, to data processing system 100. Network adapter 150 is used to connect other data processing devices to data processing system 100 across a communications network (not shown), which can be the Internet, for example. The Internet is a worldwide collection of networks and gateways that use the Transmission Control Protocol/Internet Protocol (TCP/IP) suite of protocols to communicate with one another. In other embodiments, the communications network can also be a virtual private network, intranet, local area network, wide area network, etc. The depicted and discussed examples are not meant to imply any specific architectural or network limitations with respect to the present invention.

Partition manager 121 is additionally configured to create and manage virtual network adapters (VNA) for each LSPAR or LPAR. As implemented here in some embodiments, a virtual network adapter is an emulated version of a physical network adapter and is configured to bind, or link, to its own stack of driver I/O software. Each Virtual Network adapter is able to transmit and receive data via a connection with the partition manager 121 which also has connectivity to each physical network adapter (virtual network adapter 150). In the illustrated example, partition manager 121 creates VNA A 161 and VNA B 162 to be associated, respectively, with LSPAR A 129 and LSPAR B 131. Similarly, partition manager 121 creates VNA X 164, VNA Y 166, VNA Z 168 to be respectively associated with LSPAR X 133, LSPAR Y 135, and LSPAR Z 137. As shown in FIG. 1, partition manager 121 provides a virtualization mechanism for physical network adapter 150, which can be one or more physical network ports providing connectivity to an external communications network (not shown). In one embodiment, partition manager 121 associates a unique network address with each virtual network adapter. In some embodiments, the virtual network adapter is a virtual Ethernet adapter and the network address is an Internet Protocol address. In a preferred embodiment, the network address for a given LSPAR is not an alias network address of the virtual network adapter associated with the LPAR hosting the given LSPAR. For example, the network address associated with LSPAR A 129 is not an alias network address of VNA C 170, which is associated (or bound to) LPAR 1 125.

In some embodiments, the driver I/O stack of a VNA conforms to the OSI Reference Model, which is a layered, abstract description for communications and computer network protocol design (also known as the OSI seven layer model). As used here, the term "binding" refers to a process of installing the driver I/O stack and configuring the network connection of a network adapter to a network host, with a particular network address and communication parameters. Thus a virtual network adapter, in a like manner to a physical network adapter, can be configured with a binding to a host system. Upon binding, the network adapter is configured to perform network communications between the host and the network interface associated with the network adapter. Upon unbinding a network adapter, the driver I/O stack corresponding to the virtual network adapter is disabled or uninstalled, and hence, network communications using the virtual network adapter are disabled.

Within LPAR 1 125, each VNA 161, 162, and 170 is configured with a binding to its own individual driver stack (not shown), which is installed by partition manager 121. As a result, any of VNA 161, 162, and 170 can operate independently of the others, and can be installed or removed without affecting the concurrent operation of the other virtual network adapters. Installation of a VNA 161, 162, 170 includes configuration or modification of network protocol parameters or network transport attributes associated with a particular operational condition of the VNA 161, 162, 170. Thus, as depicted in FIG. 1, VNA A 161 is configured with a binding to host LSPAR A 129, and VNA B 162 is configured with a binding to host LSPAR B 131. In some embodiments, partition manager 121 creates and configures VNA C 170 with a binding to LPAR 1 125. As a result, LPAR 125, LSPAR A 129 and LSPAR B 131 can communicate independently with each other or with an external network (not shown).

As will be particularly described below, in one embodiment, partition manager 121 is configured as firmware and/or software for: (a) creating at least one LPAR in data processing system 100, where the LPAR is configured to host an operating system; (b) creating a first VNA within the LPAR; (c) associating the first VNA with a first network address; (d) binding the first VNA to the LPAR; (e) creating a LSPAR within the LPAR, where the LSPAR employs the operating system of the LPAR and no other; (f) creating a second VNA within the LPAR; (g) associating the second VNA with a second network address, where the second network address is not an alias of the first network address; and (h) binding the second VNA to the LSPAR. Depending on the specific embodiment, partition manager 121 can include some or all of the listed code functions (a)-(h). Additionally, partition manager 121 can include program code for managing network communications between and/or among multiple LPARs and LSPARs, wherein at least some of the LPARs and LSPARs are respectively associated with independent VNAs.

According to the illustrative embodiment, when data processing system 100 executes partition manager 121, a series of processes are executed that enable the above functional features as well as additional features or functionality, which are described below with reference to FIGS. 2-3.

While the present invention has been and will continue to be described in the context of a fully functional computer system, those skilled in the art will appreciate that the present invention is capable of being distributed as a program product in a variety of forms. Examples of suitable signal bearing media include computer-readable storage media.

Figure 2:
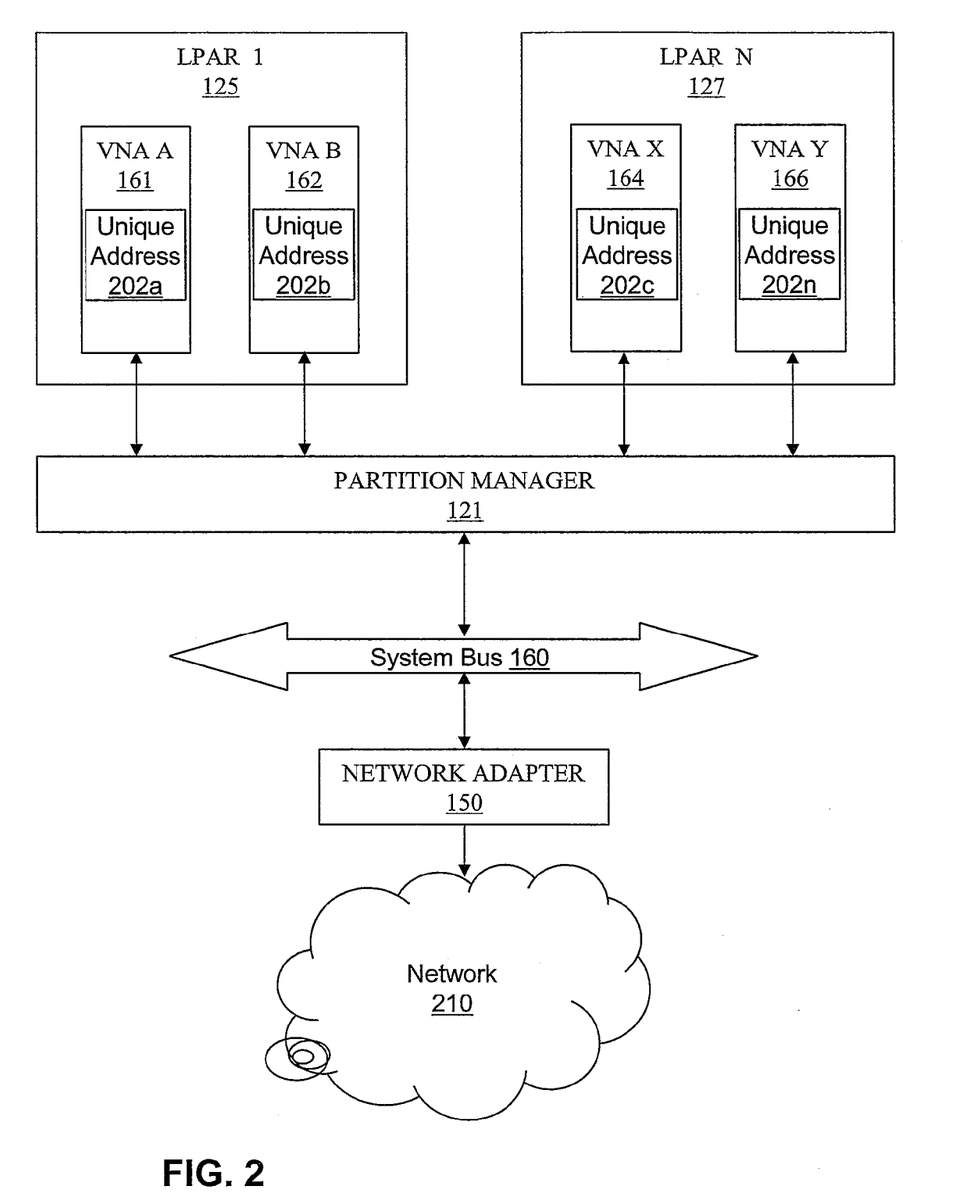
FIG. 2 is a block diagram illustrating the connectivity of the software interface modules of logical partitions to a network interface card, in accordance with one embodiment of the invention.

With reference now to FIG. 2, there is a block diagram illustrating the connectivity Virtual Network Adapters (VNA A 161,VNA B 162, VNA X 164,VNA Y 166) of logical partitions (e.g., LPAR 1 125 and LPAR N 127) to a network interface card (e.g., Network Adapter 150), in accordance with one embodiment of the invention. As described above, each virtual network adapter receives a Unique Address 202a-n. Partition Manager 121 manages the virtual network adapters and assigns unique addresses 202a-n. In one embodiment, Unique Addresses 202a-n are Internet Protocol addresses. Unique Addresses 202a-n enable the Virtual Network Adapters to interface with other Virtual Network Adapters or Network Adapter 150 through Partition Manager 121. Accordingly, Virtual Network Adapters may connect to and transmit or receive data with other devices connected to data processing system 100 via Network 210. Network 210 may be an intranet network, or an external network such as an Internet.

Figure 3:
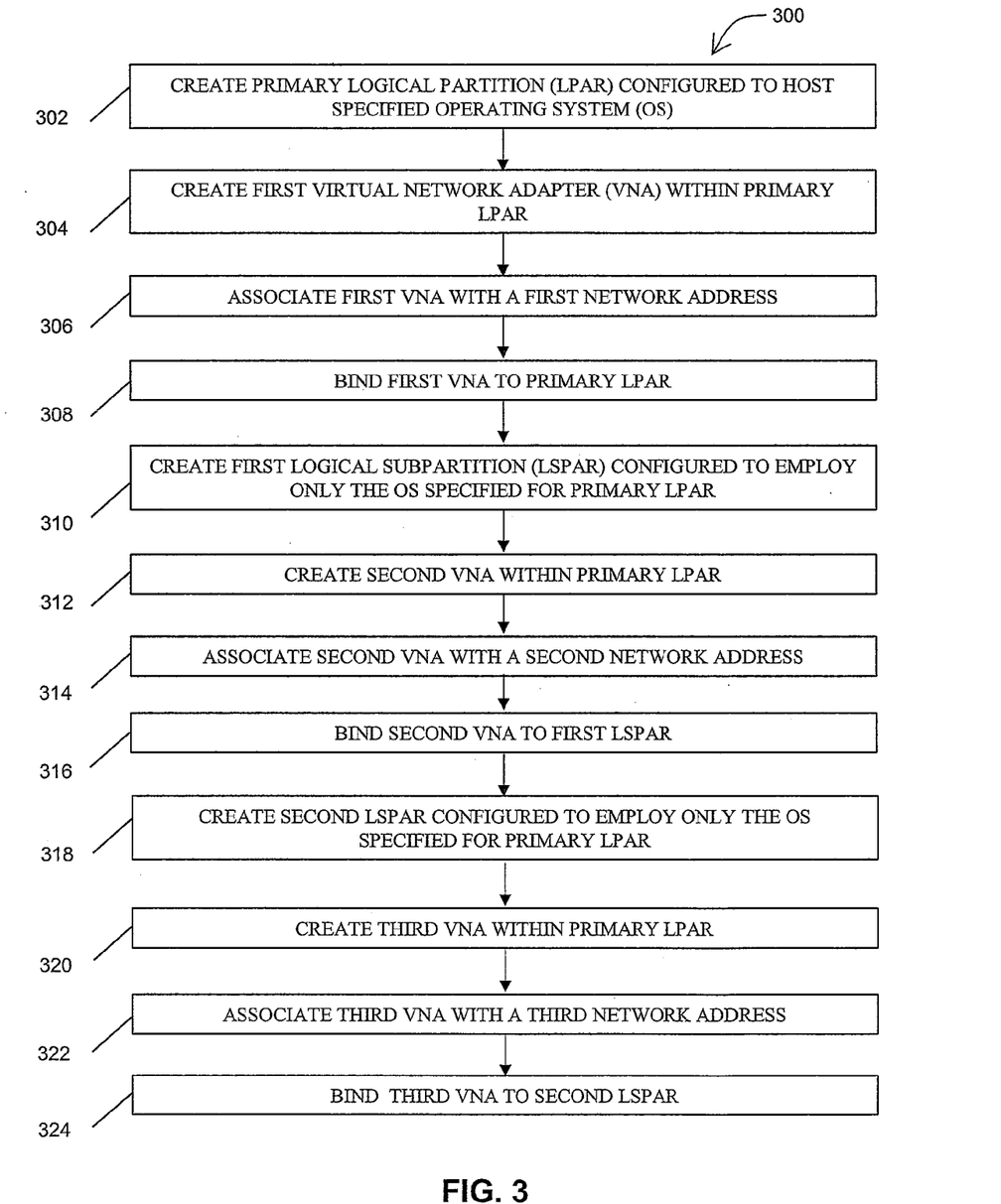
FIG. 3 is a flow chart illustrating a method in accordance with the invention, which method can be practiced using the data processing system of FIG. 1.

FIG. 3 illustrates a method 300 of configuring data processing system 100 to provide network communications between or among LPARs, LSPARs, and communication devices external to data processing system 100. In one embodiment, method 300 is performed via commands sent to and handled by partition manager 121. Provided with knowledge of the physical resources of data processing system 100, partition manager 121 creates LPAR 1 128 and configures LPAR 1 128 to host a given operating system (302); the operating system can be, for example, the AIX operating system available from International Business Machines Corporation. As part of creating LPAR 1 128, partition manager 121 creates VNA C 170 within LPAR 1 128 (304). As previously stated, VNA C 170 is an allocation of a portion of the resources of a physical network adapter, such as network adapter 150. Partition manager 121 preferably associates a first network address with VNA C 170 (306). At a step 308, partition manager 121 further binds VNA C 170 to LPAR 1 128. That is, partition manager 121 installs the driver I/O stack for, and configures the network connection of, VNA C 170 with particular communication parameters and/or attributes.

Partition manager 121 next creates LSPAR A 129 within LPAR 1 128 (310). LSPAR A 129 is configured to be supported by the operating system executing in LPAR 1 128 and no other operating system. In other words, LSPAR A 129 provides to a hosted application an operating system that is a virtual operating system environment based on the image or instance of, for example, OS 1 128 hosted by LPAR 1 128. Therefore, the virtual operating system of LSPAR A 129 is neither a separate, non-virtual instance of the OS 1 128 nor is it be of a type different from that of OS 1 128. As part of creating LSPAR A 129, partition manager 121 can create VNA A 161 within LPAR 1 128 (312). Specifically, partition manager 121 preferably associates VNA A 161 with a network address that is independent of the network address associated with VNA C 170 (314). Even more particularly, in one embodiment, partition manager 121 creates a network address for VNA A 161 that is not an alias network address of the network address associated with VNA C 170. At a step 316, partition manager 121 binds VNA A 161 to LSPAR A 129.

In some embodiments, partition manager 121 creates an additional LSPAR, such as LSPAR B 131, within LPAR 1 125 (318). Similar to the configuration of LSPAR A 129, LSPAR B 131 is configured to employ only OS 1 128 and no other. Partition manager 121 next creates VNA B 162 within LPAR 1 125 (320), associates a network address with VNA B 162 (322), and binds VNA B 162 to LSPAR B 131 (324). In a preferred embodiment, the network address associated with VNA B 162 is independent of the network addresses associated respectively with VNA A 161 and VNA C 170.

Referring to FIG. 1, method 300 can be performed as needed to configure for network connectivity other LPARs (such as LPAR N 127) and other LSPARs (such as LSPAR X 133, LSPAR Y 135, and LSPAR Z 137). Thus, as configured by method 300, data processing system 100 supports network communications between and/or among LPAR 1 125, LPAR N 127, LSPAR A 129, LSPAR B 131, LSPAR X 133, LSPAR Y 135, and LSPAR Z 137. Additionally, because VNA A 161, VNA B 162, VNAC 170, VNA X 164, VNAY 166, and VNA Z 168 are independent of each other, maintenance, modification, configuration, etc., of each VNA can be performed without interfering with the processes being executed in the respective LSPARs or LPARs.

Figure 4:
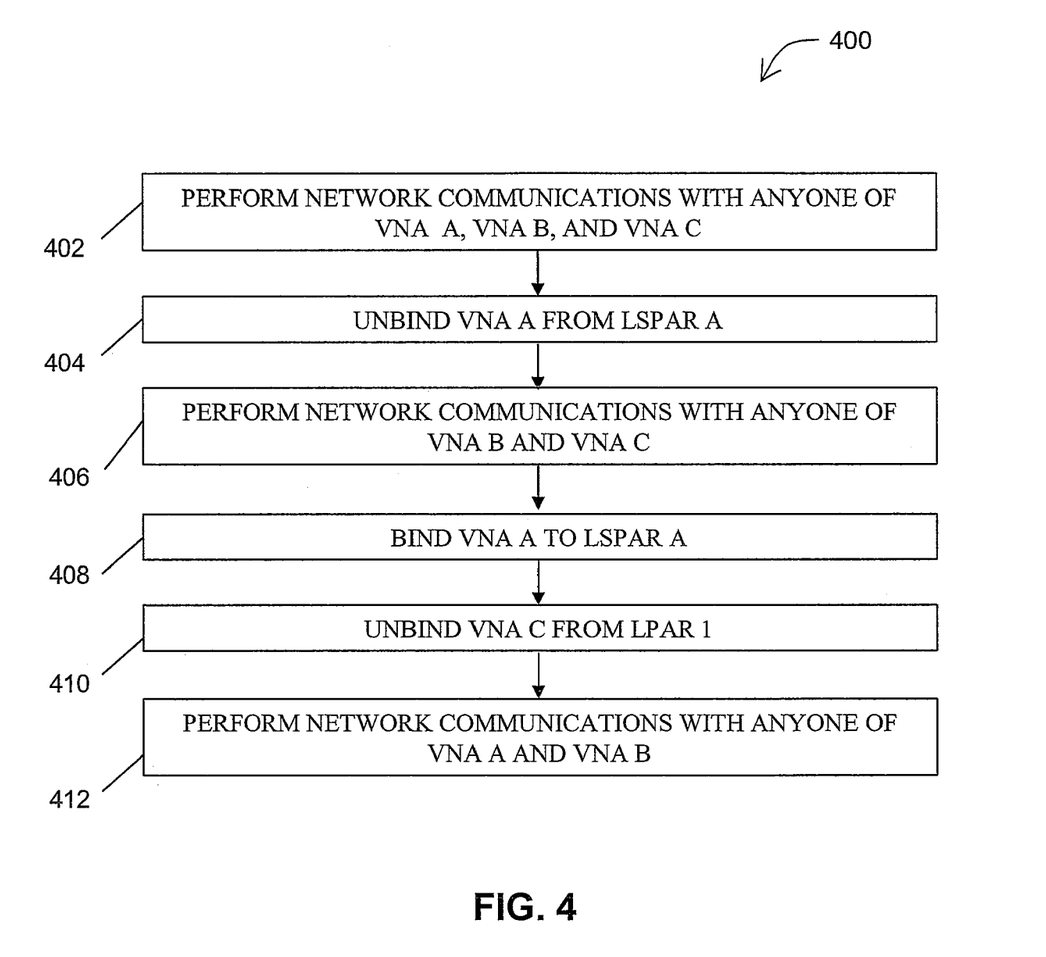
FIG. 4 is a flow chart illustrating another method in accordance with the invention, which another method can be practiced using the data processing system of FIG. 1.

FIG. 4 depicts exemplary method 400 of managing network communications in data processing system 100. Method 400 is described here to show the functionality of VNA A 161, VNA B 162, VNAC 170, VNA X 164, VNAY 166, and VNA Z 168 to support network communications independent of each other. During routine operation of data processing system 100, network communications between or among LPARs and LSPARs can take place concurrently through VNA A 161, VNA B 162, and/or VNA C 170, for example (402). At a step 404, partition manager 121 unbinds VNA A 161 from LSPAR A 129 in response to, for example, a user command. Although VNA A 161 is unable to provide network connectivity, LSPAR B 131 and LPAR 1 125 can still perform network communications through their respective VNA B 162 and VNA C 170 (406). Partition manager 121 can be directed to again bind VNA A 161 to LSPAR A 129 (408), thereby allowing LSPAR A 129 to be able to perform network communications via VNA A 161. At a step 410, partition manager 121 is commanded to unbind VNA C 170 from LPAR 1 125; hence, LPAR 1 is unable to perform network communications via VNA C 170. Although VNAC C 170 of LPAR 1 has been disabled, LSPAR A 129 and LSPAR B 131 can perform network communications via respective VNA A 161 and VNA B 162 (412). In other words, despite that VNA C 170 of the host LPAR 1 125 is disabled, the LSPARs within LPAR 1 125 are able to engage in network communications. Thus, method 400 illustrates independent and concurrent operation of VNA A 161, VNA B 162, and VNA C 170.

Embodiments of the methods described are capable of being distributed as a computer-readable, data storage product having executable program instructions. The storage product can be in a variety of forms and media types, such as floppy disks, hard disk drives, CD ROMs, DVDs, solid-state memory devices, optical memory devices, organic memory devices, liquid memory devices, magnetic memory devices, q-bit memory devices, etc.

Although the embodiments above have been described in considerable detail, numerous variations and modifications will become apparent to those skilled in the art once the above disclosure is fully appreciated. It is intended that the following claims be interpreted to embrace all such variations and modifications.

In some implementations of the illustrated methods, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of configuring a data processing system having one or more physical network adapters for facilitating network communications, the method comprising the following computer-implemented processes:
    a hypervisor creating a primary logical partition in the data processing system, the primary logical partition hosting a specified operating system;
    creating a first virtual network adapter within the primary logical partition;
    associating the first virtual network adapter with a first network address;
    binding the first virtual network adapter to the primary logical partition;
    creating a first logical subpartition within the primary logical partition;
    creating a second virtual network adapter within the primary logical partition;
    associating the second virtual network adapter with a second network address, wherein the second network address is not an alias network address of the first network address;
    binding the second virtual network adapter to the first logical subpartition; and
    a partition manager associating one or more physical network adapters with the first virtual network adapter and second virtual network adapter, wherein the network adapter is able to transmit and receive data of each of the virtual network adapters.

2. The method of claim 1, further comprising:
    creating a second logical subpartition within the primary logical partition;
    creating a third virtual network adapter within the primary logical partition;
    associating the third virtual network adapter with a third network address, wherein the third network address is not an alias network address of the first network address;
    binding the third virtual network adapter to the second logical subpartition; and
    a partition manager associating one or more physical network adapters with third virtual network adapter.

3. The method of claim 2, further comprising:
    performing network communications external to the primary logical partition using the first logical subpartition and the second virtual network adapter; and
    performing network communications external to the primary logical partition using the second logical subpartition and the third virtual network adapter, wherein the second and third virtual network adapters perform at least some network communications independently of each other.

4. The method of claim 1, further comprising:
    unbinding the primary logical partition from the first virtual network adapter such that the first virtual network adapter is disabled from performing network communications; and
    performing network communications for the primary logical partition via the second virtual network adapter.

5. The method of claim 2, further comprising, performing network communications internal to the primary logical partition utilizing the second and third virtual network adapters, wherein the first logical subpartition communicates with the second logical subpartition via the second and third virtual network adapters.

6. A data processing system comprising:
    one or more processors;
    a memory coupled to the one or more processors;
    one or more physical network adapters; and
    one or more computer logic modules having computer instructions executable on the one or more processors for:
        a hypervisor creating a primary logical partition in the data processing system, the primary logical partition hosting a specified operating system;
        creating a first virtual network adapter within the primary logical partition;
        associating the first virtual network adapter with a first network address;
        binding the first virtual network adapter to the primary logical partition;
        creating a first logical subpartition within the primary logical partition;
        creating a second virtual network adapter within the primary logical partition;
        associating the second virtual network adapter with a second network address, wherein the second network address is not an alias network address of the first network address;
        binding the second virtual network adapter to the first logical subpartition; and
        a partition manager associating one or more physical network adapters with the first virtual network adapter and second virtual network adapter, wherein the network adapter is able to transmit and receive data of each of the virtual network adapters.

7. The data processing system of claim 6, wherein the computer logic modules further comprise instructions for:
    creating a second logical subpartition within the primary logical partition;
    creating a third virtual network adapter within the primary logical partition;
    associating the third virtual network adapter with a third network address, wherein the third network address is not an alias network address of the first network address;

binding the third virtual network adapter to the second logical subpartition; and a partition manager associating one or more physical network adapters with third virtual network adapter.

8. The data processing system of claim 7, wherein the computer logic modules further comprise instructions for:

performing network communications external to the primary logical partition using the first logical subpartition and the second virtual network adapter; and performing network communications external to the primary logical partition using the second logical subpartition and the third virtual network adapter, wherein the second and third virtual network adapters perform at least some network communications independently of each other.

9. The data processing system of claim 6, wherein the computer logic modules further comprise instructions for:

unbinding the primary logical partition from the first virtual network adapter such that the first virtual network adapter is disabled from performing network communications; and performing network communications for the primary logical partition via the second virtual network adapter.

10. The data processing system of claim 7, wherein the computer logic modules further comprise instructions for, performing network communications internal to the primary logical partition utilizing the second and third virtual network adapters, wherein the first logical subpartition communicates with the second logical subpartition via the second and third virtual network adapters.

11. A computer program product embodying a computer-readable storage medium having a plurality of instructions embodied therein, wherein the plurality of instructions, when executed by a processor, allows a machine to:

create, via a hypervisor, a primary logical partition in a data processing system, the primary logical partition hosting a specified operating system;

create a first virtual network adapter within the primary logical partition;

associate the first virtual network adapter with a first network address;

bind the first virtual network adapter to the primary logical partition;

create a first logical subpartition within the primary logical partition;

create a second virtual network adapter within the primary logical partition;

associate the second virtual network adapter with a second network address, wherein the second network address is not an alias network address of the first network address;

bind the second virtual network adapter to the first logical subpartition; and associate, via a partition manager, one or more physical network adapters with the first virtual network adapter and second virtual network adapter, wherein the network adapter is able to transmit and receive data of each of the virtual network adapters.

12. The computer program product of claim 11, the plurality of instructions further comprising instructions for enabling the machine to:

create a second logical subpartition within the primary logical partition;

create a third virtual network adapter within the primary logical partition;

associate the third virtual network adapter with a third network address, wherein the third network address is not an alias network address of the first network address;

bind the third virtual network adapter to the second logical subpartition; and a partition manager associate one or more physical network adapters with third virtual network adapter.

13. The computer program product of claim 12, the plurality of instructions further comprising instructions for enabling the machine to:

perform network communications external to the primary logical partition using the first logical subpartition and the second virtual network adapter; and perform network communications external to the primary logical partition using the second logical subpartition and the third virtual network adapter, wherein the second and third virtual network adapters perform at least some network communications independently of each other.

14. The computer program product of claim 11, the plurality of instructions further comprising instructions for enabling the machine to:

unbind the primary logical partition from the first virtual network adapter such that the first virtual network adapter is disabled from performing network communications; and perform network communications for the primary logical partition via the second virtual network adapter.

15. The computer program product of claim 11, the plurality of instructions further comprising instructions for enabling the machine to, perform network communications internal to the primary logical partition utilizing the second and third virtual network adapters, wherein the first logical subpartition communicates with the second logical subpartition via the second and third virtual network adapters.

* * * * *